Patented Apr. 29, 1952

2,594,322

UNITED STATES PATENT OFFICE 2,594,322

SUBSTITUTED OXACYCLOALKANES

Nelson J. Leonard, Urbana, Ill., assignor to Phillips Petroleum Company, a corporation of Delaware No Drawing. Application June 9, 1950, Serial No. 167,255

18 Claims. (Cl. 260—333)

1

This invention relates to substituted oxacycloalkanes and to their production.

It is an object of this invention to provide substituted oxacycloalkanes as new compositions.

It is another object to provide a process for the production of substituted oxacycloalkanes.

It is another object to provide for the inter-reaction of a hydroperoxycycloalkane with an acid to produce a substituted oxacycloalkane.

Other objects will be apparent to those skilled in the art in the light of the accompanying discussion and disclosure.

In accordance with my invention, substituted oxacycloalkanes, as new and novel compositions, are produced by the inter-reaction of selected hydroperoxycycloalkanes with either formic or acetic acid.

The new compositions of my invention are represented by the structural formula:

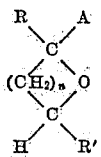

where R is an alkyl radical containing from 1 to 4 carbon atoms, R' is of the group consisting of hydrogen and an alkyl radical containing from 1 to 3 carbon atoms, the sum of the carbon atoms in R and R' being not greater than 4, A is a stable anion of the group consisting of acetoxy and formoxy, and wherein $n$ is an integer of the group 3 and 4. These compositions are more specifically referred to as 2-acetoxy-2-alkyloxacycloalkanes, 2 - acetoxy - 2,6-dialkyloxacycloalkanes, 2 - acetoxy - 2,7 - dialkyloxacycloalkanes, 2-formoxy - 2 - alkyloxacycloalkanes, 2 - formoxy-2,6-dialkylcycloalkanes, and 2 - formoxy - 2,7-dialkyloxacycloalkanes. R', when an alkyl radical, is selected from the group consisting of methyl, ethyl, n-propyl and isopropyl; R is selected from the group consisting of methyl, ethyl, n-propyl, isopropyl, n-butyl, isobutyl, and tert-butyl.

The hydroperoxycycloalkanes reactant materials, sometimes also referred to as naphthene hydroperoxides, are represented by the structural formula:

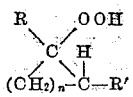

wherein R, R', and $n$ are the same as described hereabove with respect to the new compositions of my invention. Among specific hydroperoxides,

2 particularly applicable as reactant materials in the process of my invention, are 1-methyl-1-hydroperoxycyclohexane, 1,2 - dimethyl - 1 - hydroperoxycyclohexane, 1-ethyl-1-hydroperoxycyclohexane, 1,2-diethyl-1-hydroperoxycyclohexane, 1 - methyl - 2 - ethyl-1-hydroperoxycyclohexane, 1 - propyl - 1 - hydroperoxycyclohexane, and 1 - butyl - 2 - propyl - 1 - hydroperoxycyclohexane; 1 - methyl - 1 - hydroperoxycyclopentane, 1,2-dimethyl - 1 - hydroperoxycyclopentane, 1 - ethyl-1-hydroperoxycyclopentane, 1,2-diethyl-1-hydroperoxycyclopentane, 1 - methyl - 2 - propyl - 1-hydroperoxycyclopentane, 1 - propyl - 1 - hydroperoxycyclopentane, and 1-butyl-2-propyl-1-hydroperoxycyclopentane.

Preparation of the hydroperoxycycloalkane reactant materials described above can be carried out in any suitable manner. These reactant materials can be utilized in a pure state or in the form of a concentrate containing materials which are inert under the conditions of the process reaction.

One method by which these hydroperoxycycloalkane reactant materials can be prepared is disclosed in the copending application of William M. Hutchinson, Serial No. 69,231, filed January 4, 1949. In that copending application is disclosed the preparation of hydroperoxycycloalkanes, by a naphthene hydrocarbon oxidation process involving the steps: (1) oxidizing a naphthene hydrocarbon with an oxygen-containing gas, (2) removal of all or a portion of the oxidized naphthene hydrocarbon from the resulting oxidation mixture, (3) contacting the resulting residual peroxide-containing concentrate with a strong non-volatile mineral acid, whereby the contaminants in the oxidation mixture enter the acid phase, (4) separating a total acid treating mixture into an acid phase and a hydroperoxide phase, and (5) recovering a purified hydroperoxide, or a hydroperoxide solution, as the desired product.

Illustrative of the preparation of a hydroperoxycycloalkane, as disclosed in the copending application referred to, is the following. A narrow-boiling range hydrocarbon concentrate comprising 85 per cent methylcyclohexane is charged to an oxidation reaction zone to which is also charged compressed oxygen. The feed rate of the methylcyclohexane charge is controlled to maintain a liquid residence time of 40 minutes in the reaction zone, which is held at a temperature of 145° C. and at a pressure of 500 p. s. i. g. The oxygen feed rate is sufficient to supply 0.1 mol of oxygen per mol of methylcyclohexane. The oxidation effluent is discharged to a distillation zone where part or substantially all of the unreacted hydrocarbon material is taken overhead and returned to the oxidation zone. The distillation zone is operated, preferably under low pressure, so that the kettle temperature does not exceed about 25° C. The residue, or reaction concentrate, is passed from the distillation zone to a mixing zone where it is intimately mixed by any suitable means, such as by a mechanical stirrer, for about two minutes with a 50 weight per cent aqueous solution of sulfuric acid. The volume of acid added is controlled so that it is equal to one-tenth that of the reaction product being treated. The resulting mixture is discharged to a separation zone where it separates into an acid phase and a hydroperoxide phase. A residence time of eight minutes is sufficient to allow the hydroperoxide phase to separate from the acid phase. The temperature in the mixing zone and in the separation zone is held at about $-5°$ C. The hydroperoxide phase is separated from the acid phase. The acid treatment may be repeated one or more times if desired. Following the acid treatment, the hydroperoxide concentrate is treated with a basic material, such as sodium carbonate, an alkali metal hydroxide, or the like, to remove acidic materials. The hydroperoxide layer is separated from the aqueous sodium carbonate layer and recovered as the purified hydroperoxide product.

Hydroperoxide concentrate prepared as above described, contains generally from 10 to 90 per cent or more by weight of the hydroperoxide. Generally, however, when employing a concentrate of this type it is preferable that it contain at least 30 per cent by weight of the hydroperoxide reactant material. Although a concentrate can be employed, it is preferable that substantially pure reactant materials be utilized, primarily for the reason that smaller volumes of reaction mixtures will be employed, thus reducing the equipment requirements, and required reaction time at any given temperature level.

Although, of course, the preparative method above discussed for the production of hydroperoxycycloalkane reactants utilized in the process of my invention can be used, it is to be understood that my invention is not limited thereby, and that any known suitable method for the preparation of these materials can be employed.

Broadly, in the preparation of the substituted oxacycloalkane compositions of my invention, the hydroperoxide reactant is admixed with the acid reactant and the resulting admixture maintained, under reaction conditions of temperature, pressure and time, preferably under a constant state of agitation. In one preferred embodiment the hydroperoxide is added to the acid, either portionwise or continuously, and the rate of addition is adjusted as to allow sufficient time after all the hydroperoxide has been introduced into the reaction mixture for completing the conversion of hydroperoxide. The actual contact time is dependent upon a number of variables, particularly temperature, the reactivity of the specific hydroperoxide reactant, and the concentration of the hydroperoxide reactant in the reaction mixture. In general, the shorter the time of reaction, the higher the required temperature. At the conclusion of the reaction, the desired product is recovered from the reaction mixture by any desired means, generally by distillation.

I prefer to utilize an excess of acid in the reaction mixture with respect to the amount stoichiometrically required for reacting with the hydroperoxide. In general, the weight ratio of acid to the hydroperoxycycloalkane reactant, introduced into the reaction zone, can be selected from within the limits of 2:1 to 50:1, and from within a preferred range of 5:1 to 20:1. Although acid containing 5 volume per cent water can be utilized as a reactant in my process, I prefer that the acid reactant be substantially anhydrous for the reason that hydrolysis of the substituted oxacyloalkane product present in the reaction mixture can occur under the process conditions employed, thus reducing the yield of the desired product obtained. However, if desired, an acid reactant containing more than 5 per cent water can be utilized, the consequence being a lower yield of desired oxacycloalkane product. The use of a non-anhydrous acid would, of course, be particularly advantageous were it desired that the final reaction product contain hydrolysis product of the substituted oxacycloalkane formed.

Reaction temperatures within the limits of 40 to 150° C. can be utilized, although more generally within the limits of 60 to 120° C. Preferably, I utilize a temperature within the limits of from 60° C. to the boiling point of the reaction mixture when maintaining the reaction under total reflux.

Although a pressure far exceeding atmospheric pressure can be utilized in the practice of my invention, the reaction in most embodiments is efficient at atmospheric pressure, particularly at the boiling point of the reaction mixture. However, pressures higher than atmospheric and as high as 500 p. s. i. g., or higher can be utilized, if desired.

Contact time is dependent upon the temperature employed, as discussed above, and can be accordingly varied over a wide range. Generally, a reaction time of from 5 minutes to 160 hours can be employed, such a selected time being suitable at a temperature within the broad temperature range already described. However, when carrying out the reaction employing the preferred temperature range I find that the contact time can be selected satisfactorily from within the limits of 30 minutes to 30 hours.

In a preferred embodiment of the process of my invention I maintain the reactant materials under total reflux at atmospheric pressure and continue the refluxing until the hydroperoxide is substantially completely reacted. In this manner the desired product is formed in a maximum yield, and there is no problem of separation of any unreacted hydroperoxycycloalkane reactant material, in the recovery of the desired product from the reaction mixture. I find that when maintaining the reaction mixture under total reflux, the total reaction time required to completely react the hydroperoxide reaction with the acid is within the limits of from 1 to 20 hours. However, some reaction takes place immediately, such as for example, after about the first 5 minutes of the refluxing period, but in order to substantially completely react the hydroperoxide, longer times are required.

The substituted oxacycloalkane compositions of my invention are valuable chemical intermediates for the production of hydroxy ketones, and dihydric alcohols or glycols. Production of the hydroxy ketones is readily accomplished by hydrolysis of the oxacycloalkanes of my invention. At room temperature these compositions will hydrolyze completely, generally in less than one hour. Dihydric alcohols are prepared from the hydroxy ketones thus formed by hydrogenation.

Advantages of this invention are illustrated by the following examples. The reactants, and their proportions, and other specific ingredients are presented as being typical and should not be construed to limit the invention unduly.

Example I

A methylcyclohexane hydroperoxide concentrate, containing 58 per cent methylcyclohexane hydroperoxide, was prepared by air oxidation of methylcyclohexane and subsequent treatment with a 50 per cent aqueous solution of sulfuric acid followed by washing with an aqueous solution of sodium carbonate. A sufficient amount of this hydroperoxide concentrate to produce 10 parts by weight of the hydroperoxide was added over a period of one minute, with constant stirring, to 40 parts by weight of glacial acetic acid which had previously been charged to the reactor. The temperature of the mixture was maintained at 65° C. for 18 hours at which time 80 per cent of the hydroperoxide had reacted. The mixture was then refluxed for one hour to complete the reaction. Upon distillation of the material, 3.2 parts of 2-acetoxy-2-methyloxepane,

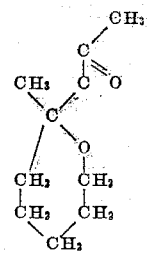

boiling at 98–104° C./4 mm. Hg, was obtained. Upon analysis of this compound, the following results were obtained:

|  | Found | Calculated |
|---|---|---|
| Per cent Carbon | 62.68 | 62.76 |
| Per cent Hydrogen | 9.69 | 9.35 |
| Per cent Oxygen, by difference | 27.63 | 27.87 |
| Molecular Weight | 177 | 172 |
| Saponification equivalent* | 185 | 172 |

*Equivalent weight by saponification.

Example II

The semicarbazone of 7-hydroxy-2-heptanone, formed by hydrolysis of 2-acetoxy-2-methyloxepane, was prepared by treatment of the 2-acetoxy-2-methyloxepane with an aqueous solution of semicarbazide hydrochloride. The crystalline derivative had a melting point of 129° C.

As will be evident to those skilled in the art, various modifications can be made or followed, in the light of the foregoing disclosure and discussion, without departing from the spirit or scope of the disclosure or from the scope of the claims.

I claim:

1. A process for the production of a substituted oxacycloalkane having a composition in accordance with the structural formula:

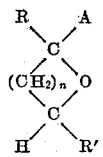

wherein R is an alkyl radical containing from 1 to 4 carbon atoms, R' is selected from the group consisting of hydrogen and an alkyl radical containing from 1 to 3 carbon atoms, the sum of the carbon atoms in R and R' is from 1 to 4, A is a stable anion of the group consisting of acetoxy and formoxy, and wherein n is an integer of the group 3 and 4; comprising reacting a hydroperoxycycloalkane with an acid selected from the group consisting of formic acid and acetic acid, said hydroperoxycycloalkane having a composition in accordance with the structural formula:

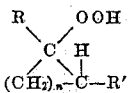

wherein R is an alkyl radical containing from 1 to 4 carbon atoms, R' is selected from a group consisting of hydrogen and an alkyl radical containing from 1 to 3 carbon atoms and n is an integer of the group 3 and 4.

2. The process of claim 1 wherein said acid is formic acid and said hydroperoxycycloalkane is 1-methyl-1-hydroperoxycyclopentane.

3. The process of claim 1 wherein said acid is acetic acid and said hydroperoxycycloalkane is 1-methyl-1-hydroperoxycyclohexane.

4. The process of claim 1 wherein said acid is acetic acid and said hydroperoxycycloalkane is 1,2-dimethyl-1-hydroperoxycyclohexane.

5. The process of claim 1 wherein said acid is acetic acid and said hydroperoxycycloalkane is 1-propyl-1-hydroperoxycyclopentane.

6. The process of claim 1 wherein said hydroperoxycycloalkane is 1,2-diethyl-1-hydroperoxycyclohexane and said acid is formic acid.

7. A process for the preparation of 2-acetoxy-2-methyloxepane, comprising admixing 1-methyl-1-hydroperoxycyclohexane with acetic acid in a weight ratio of acetic acid to said hydroperoxycyclohexane within the limits of 2:1 and 50:1, heating the resulting admixture at a temperature within the limits of 40 and 150° C. under a pressure of from 0 to 500 p. s. i. g. and for a period of from 5 minutes to 160 hours, and recovering 2-acetoxy-2-methyloxepane from the resulting reaction mixture as a product of the process.

8. The process of claim 7 wherein said weight ratio is within the limits of 5:1 to 20:1, said temperature is within the limits of 60 to 120° C., and said contact time is within the limits of from 0.5 to 30 hours.

9. A process for the preparation of 2-formoxy-2-methyloxacyclohexane, comprising admixing formic acid of at least 95 per cent purity with 1-methyl-1-hydroperoxycyclohexane, in a weight ratio of said acid to said hydroperoxycyclohexane within the limits of 2:1 to 50:1, heating the resulting admixture at a temperature within the limits of 40 and 150° C. under pressure of from 0 to 500 p. s. i. g. and for a period of from 5 minutes to 160 hours; and recovering 2-formoxy-2-methyloxacyclohexane from the reaction mixture as a product of the process.

10. A process for the preparation of 2-acetoxy-2-methyloxepane comprising admixing 1-methyl-1-hydroperoxycyclohexane with acetic acid in a weight ratio of acetic acid to said hydroperoxycyclohexane within the limits of 5:1 to 20:1 and heating the resulting admixture at a temperature within the limits of from 40 to 150° C. for a period of from 30 minutes to 30 hours, and recovering 2-acetoxy-2-methyloxepane from the resulting reaction mixture as a product of the process.

11. The process of claim 10 wherein said 1- methyl-1-hydroperoxycyclohexane is introduced into reaction with said acid as a concentric containing at least 30 per cent of said hydroperoxycyclohexane and wherein the resulting admixture is maintained under total reflux at atmospheric pressure for a period of from 0.5 to 30 hours.

12. The process of claim 10 wherein said hydroperoxide is added to said acetic acid while the resulting reaction admixture is maintained under reflux, and wherein the total reaction time is within the limits of from 1 to 20 hours.

13. A substituted oxacycloalkane having a composition in accordance with the structural formula:

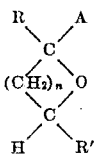

wherein R is an alkyl radical containing from 1 to 4 carbon atoms, R' is selected from the group consisting of hydrogen and an alkyl radical containing from 1 to 3 carbon atoms, the sum of the carbon atoms in R and R' is from 1 to 4, $n$ is an integer of the group 3 and 4, and wherein A is a stable anion of the group consisting of acetoxy and formoxy.

14. 2-acetoxy-2-methyloxepane.

15. A process for the production of a substituted oxacycloalkane comprising reacting a 1-alkyl - 1 - hydroperoxycyclohexane, wherein the alkyl group contains from 1 to 4 carbon atoms, with an acid selected from the group consisting of formic and acetic acid.

16. A process for the production of a substituted oxacycloalkane comprising reacting a 1-alkyl - 1 - hydroperoxycyclopentane, wherein the alkyl group contains from 1 to 4 carbon atoms, with an acid selected from the group consisting of formic and acetic acid.

17. A process for the production of a substituted oxacycloalkane comprising reacting a 1,2-dialkyl-1-hydroperoxycyclohexane wherein each alkyl group contains from 1 to 4 carbon atoms, with an acid selected from the group consisting of formic and acetic acid.

18. A process for the production of a substituted oxacycloalkane comprising reacting a 1,2-dialkyl-1-hydroperoxycyclopentane wherein each alkyl group contains from 1 to 4 carbon atoms, with an acid selected from the group consisting of formic and acetic acid.

NELSON J. LEONARD.

REFERENCES CITED

The following references are of record in the file of this patent:

UNITED STATES PATENTS

| Number | Name | Date |
|---|---|---|
| 2,479,283 | Whetstone | Aug. 16, 1949 |

FOREIGN PATENTS

| Number | Country | Date |
|---|---|---|
| 606,764 | Great Britain | Aug. 19, 1948 |

OTHER REFERENCES

Linnell, Quart. J. Pharm. Pharmacol. 3, 40–51 (1930), Chem. Abst. 24, 3200 (1930).